(12) United States Patent
Murata et al.

(10) Patent No.: US 8,537,475 B2
(45) Date of Patent: Sep. 17, 2013

(54) COMPOSITE OPTICAL ELEMENT

(75) Inventors: Jun Murata, Osaka (JP); Toshiaki Takano, Osaka (JP)

(73) Assignee: Panasonic Corporation, Osaka (JP)

( * ) Notice: Subject to any disclaimer, the term of this patent is extended or adjusted under 35 U.S.C. 154(b) by 606 days.

(21) Appl. No.: 12/304,607

(22) PCT Filed: Jun. 6, 2007

(86) PCT No.: PCT/JP2007/061470
§ 371 (c)(1),
(2), (4) Date: Dec. 12, 2008

(87) PCT Pub. No.: WO2007/145118
PCT Pub. Date: Dec. 21, 2007

(65) Prior Publication Data
US 2009/0323502 A1     Dec. 31, 2009

(30) Foreign Application Priority Data
Jun. 13, 2006 (JP) .................. 2006-163597

(51) Int. Cl.
*G02B 3/08* (2006.01)
*G02B 5/18* (2006.01)

(52) U.S. Cl.
USPC ........................................ 359/743; 359/576

(58) Field of Classification Search
USPC .... 359/576, 743, 742, 565, 724; 369/112.04, 369/112.07
See application file for complete search history.

(56) References Cited

U.S. PATENT DOCUMENTS

| 5,946,281 A * | 8/1999 | Ito et al. ............... 369/112.07 |
| 2002/0036827 A1* | 3/2002 | Nakai ............... 359/565 |
| 2003/0161044 A1* | 8/2003 | Tokoyoda ............... 359/569 |
| 2005/0046947 A1* | 3/2005 | Nakamura ............... 359/576 |

FOREIGN PATENT DOCUMENTS

| JP | 11-287904 | 10/1999 |
| JP | 2004-240417 | 8/2004 |
| JP | 2006-120247 | 5/2006 |

OTHER PUBLICATIONS

International Search Report for corresponding Application No. PCT/JP2007/061470 mailed Sep. 18, 2007.
Form PCT/ISA/237.

* cited by examiner

*Primary Examiner* — Alessandro Amari
(74) *Attorney, Agent, or Firm* — Renner, Otto, Boisselle & Sklar, LLP

(57) ABSTRACT

The present invention relates to composite optical elements, and particularly to a composite optical element including a first optical component and a second optical component coupled to the first optical component.
The present invention is advantageous in enhancing optical properties.
A composite optical element (1) includes a first optical component (10) and a second optical component (20). The first optical component (10) is made of first glass and has a lens surface (12). The second optical component (20) is made of a material different from the first glass, is coupled to the first optical component (10) at a lens surface (22), and has a lens surface (22) at a side opposite to the first coupling surface (21). The lens surface (12) partially has a first uneven region (12*a*). The lens surface (22) partially has a second uneven region (22*a*).

6 Claims, 5 Drawing Sheets

COMPOSITE OPTICAL ELEMENT

TECHNICAL FIELD

The present invention relates to composite optical elements, and more particularly to a composite optical element including a first optical component and a second optical component coupled to the first optical component.

BACKGROUND ART

Composite optical elements each including two or more optical components are known to date. For example, in a composite optical element including two optical components, these optical components, i.e., first and second optical components, are coupled to each other. Such composite optical elements are used in various optical systems, and can be used as lenses by forming diffraction structures in their coupling surfaces, for example.

Most of the diffraction structures formed in the coupling surfaces are grating structures each made of evenly-spaced small slits or grooves in a number of about several tens to about several hundreds per a fine spacing (about 1 mm), as disclosed in, for example, Patent Document 1. Upon incidence of light on such a diffraction structure, a diffracted luminous flux is generated in a direction determined by the pitch (spacing) between the slits or grooves and the wavelength of incident light. This diffracted luminous flux is focused on one point, thereby allowing a composite optical element having such a diffraction structure to function as a lens.

In the case of using a composite optical element as a lens, a composite optical element in which a second optical component made of resin is coupled to a first optical component made of glass is employed, for example. Such a structure achieves a diffraction efficiency of 90% or more in a wide wavelength range from h-line (404.7 nm) to C-line (656.3 nm) by utilizing a wavelength characteristic opposite to that of a general lens made of a single glass or a single resin, i.e., by utilizing a characteristic in which the refractive index increases as the wavelength increases.

Patent Document 1: Japanese Laid-Open Patent Publication No. 11-287904

DISCLOSURE OF INVENTION

Problems that the Invention is to Solve

As described above, a composite optical element includes two or more optical components and these optical components are made of different materials in many cases. Thus, it is difficult to enhance optical properties thereof.

It is therefore an object of the present invention to provide a composite optical element with enhanced optical properties.

Means of Solving the Problems

A composite optical element according to the present invention includes: a first optical component; and a second optical component. The first optical component has a first optical functional surface and is made of first glass. The second optical component is made of a material different from the first glass, is coupled to the first optical component at the first optical functional surface, and has a second optical functional surface at a side opposite to a first coupling surface of the second optical component at which the second optical component is coupled to the first optical component. The first and second optical functional surfaces partially have first and second uneven regions, respectively.

Effects of the Invention

The present invention may enhance optical properties.

DESCRIPTION OF NUMERALS

Figure 1:
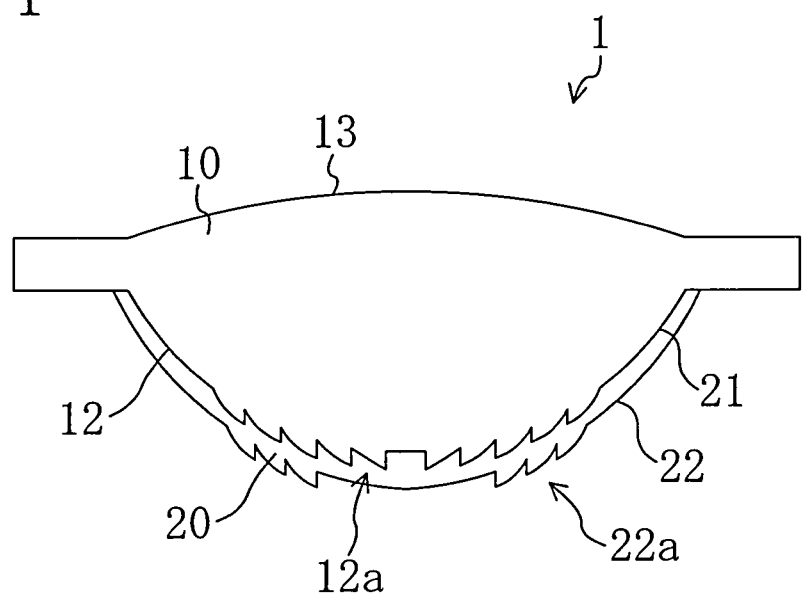
FIG. 1 is a cross-sectional view schematically illustrating a composite optical element according to Embodiment 1.

1, 2, 3, 101, 201, 301, 401 composite optical element
10, 30, 110 first optical component
12, 112 lens surface (first optical functional surface)
12*a*, 112*a*, 212*a* first uneven region
13, 33, 113 lens surface (third optical functional surface)
20, 120 second optical component
21, 121 first coupling surface
22, 122 lens surface (second optical functional surface)
22*a*, 122*a* second uneven region
33*a* third uneven region
40 third optical component
41 second coupling surface
42 lens surface (fourth optical functional surface)
42*a* fourth uneven region

BEST MODE FOR CARRYING OUT THE INVENTION

Hereinafter, embodiments of the present invention will be described with reference to the drawings. It should be noted that the present invention is not limited to the following embodiments.

Embodiment 1

In Embodiment 1 of the present invention, a composite lens is described as a specific example of a composite optical element. Specifically, a structure and a formation method thereof are described.

FIG. 1 is a cross-sectional view schematically illustrating a structure of a composite optical element 1 according to this embodiment.

In the composite optical element 1 of this embodiment, a second optical component 20 is coupled to a first optical component 10 at a lens surface (first optical functional surface) 12 of the first optical component 10. The first optical component 10 is made of first glass. The lens surface 12 partially has a first uneven region 12a. The second optical component 20 is made of a material (e.g., an energy-curing resin) except for the first glass and has a lens surface (second optical functional surface) 22 at the side opposite to the first coupling surface. The lens surface 22 partially has a second uneven region 22a. In this embodiment, each of the first and second uneven regions 12a and 22a is a diffraction part having a sawtooth section.

In general, to make an uneven region as a diffraction part or the like, this uneven region needs to be accurately formed. In the composite optical element 1 of this embodiment, the first and second uneven regions 12a and 22a are formed in parts of the lens surfaces 12 and 22, respectively. Accordingly, the uneven regions of the composite optical element 1 of this embodiment may be easily and accurately formed in a desired shape, as compared to a composite optical element 1 in which an uneven region is formed in the entire lens surface. As a result, degradation of optical properties (such as aberration and light-focusing efficiency) may be prevented.

The composite optical element 1 of this embodiment is now specifically described. The first optical component 10 is an aspherical lens. The first optical component 10 has a smooth lens surface (third optical functional surface) 13 at the side opposite to the lens surface 12. The lens surface 12 has a first uneven region 12a and a first smooth region (not shown). The first uneven region 12a surrounds the optical axis of the first optical component 10 and, more specifically, is located on the circumference of a circle about a point on the optical axis. The first uneven region 12a functions as a diffraction part. The first smooth region is closer to the rim than the first uneven region 12a. Accordingly, optical power at the lens surface 12 differs between the first uneven region 12a and the first smooth region.

The second optical component 20 is preferably made of an energy-curing resin. The energy-curing resin is a resin which is cured with application of given energy, and is one of a UV-curing resin, a thermosetting resin, and an electron beam-curing resin, for example. The lens surface 22 has a second uneven region 22a and second and third smooth regions (not shown). Specifically, in the lens surface 22, the second smooth region, the second uneven region 22a, and the third smooth region are arranged in order in the direction from the optical axis to the rim, i.e., are concentrically arranged with respect to a point on the optical axis. Accordingly, optical power at the lens surface 22 differs between the second and third smooth regions and the second uneven region 22a.

Arrangement of the uneven regions and the smooth regions in the whole composite optical element 1 is now described. The second uneven region 22a overlaps the first uneven region 12a when viewed in the optical axis direction of the composite optical element 1. Accordingly, when viewed from the bottom of the composite optical element 1 in FIG. 1, the second smooth region overlaps the first uneven region 12a near the optical axis of the composite optical element 1, the second uneven region 22a overlaps the first uneven region 12a in an area closer to the rim, and the third smooth region overlaps the first smooth region in an area much closer to the rim. In this manner, three regions exhibiting different levels of optical power are present at the bottom of the composite optical element 1 illustrated in FIG. 1 so that the composite optical element 1 can focus three light beams having different wavelengths.

Figure 2:
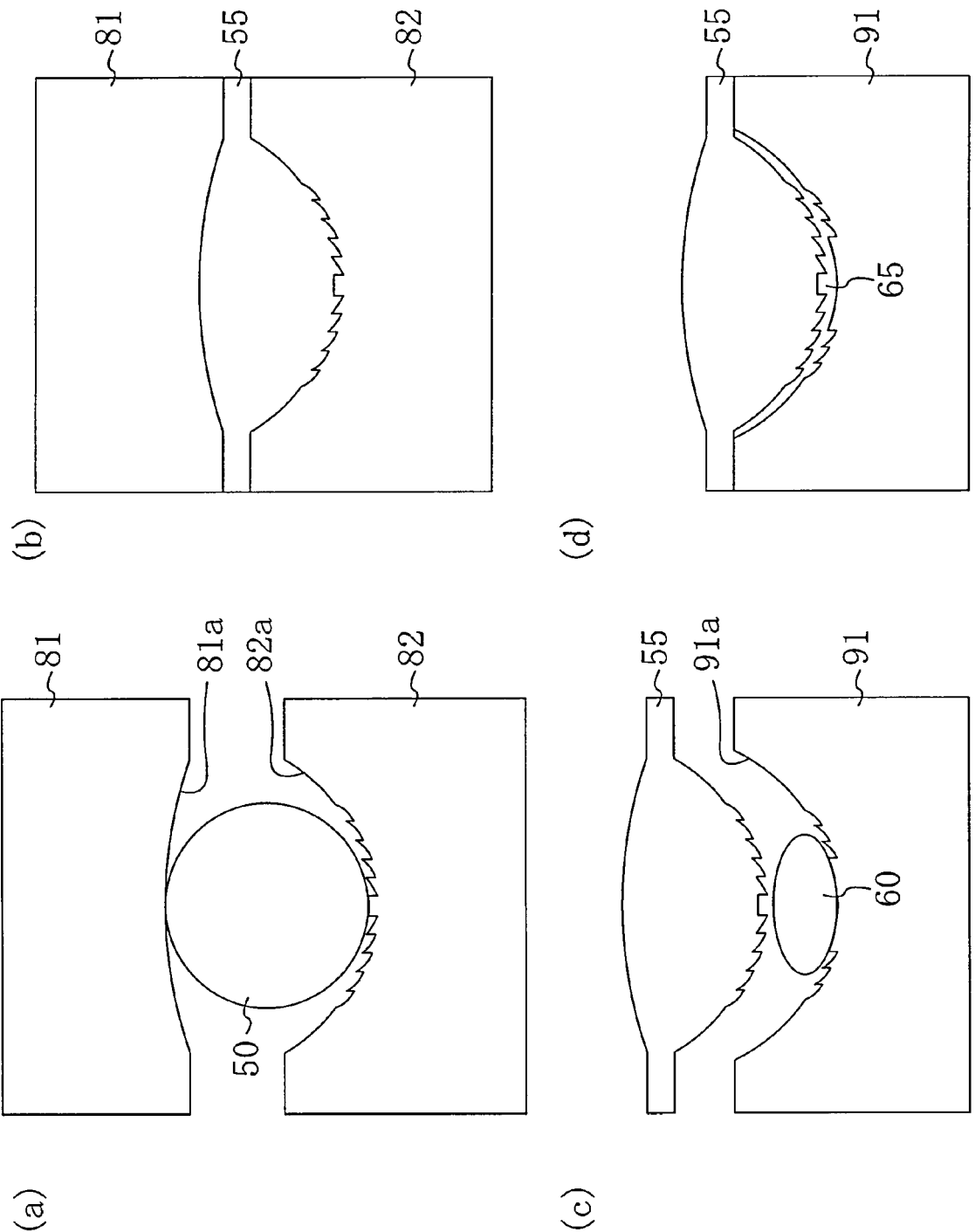
FIGS. 2(*a*) through 2(*d*) are cross-sectional views showing a method for manufacturing a composite optical element according to Embodiment 1.

FIGS. 2(a) through 2(b) are cross-sectional views schematically illustrating a method for manufacturing a composite optical element 1 according to this embodiment. First, in the method for manufacturing a composite optical element 1 of this embodiment, a first optical member 55 to be a first optical component 10 is press-molded in process steps shown in FIGS. 2(a) and 2(b). Then, in process steps shown in FIGS. 2(c) and (d), a resin preform 60 is pressed against the first optical member 55, thereby molding a composite optical element 1. This press-molding for the composite optical element 1 allows an aspherical lens surface and an uneven region having a sawtooth section to be molded at a time and also enables the molding to be easily and accurately performed. Now, the manufacturing method is specifically described.

First, as shown in FIG. 2(a), a molding die for molding a first optical member 55 and a glass preform 50 are prepared. The glass preform 50 preferably has a shape similar to the first optical member 55. The molding die includes an upper die 81 and a lower die 82. The upper die 81 and the lower die 82 have molding surfaces 81a and 82a, respectively. The molding surface 81a is used for molding an upper lens surface (i.e., a lens surface to be a lens surface 13 of a first optical component 10) of the first optical member 55 and, therefore, is formed smooth. The molding surface 82a is used for molding a lower lens surface (i.e., a lens surface to be a lens surface 12 of the first optical component 10) of the first optical member 55 and, therefore, partially has an uneven surface corresponding to a first uneven region. The lower die 82 is placed with the molding surface 82a facing upward. On this molding surface 82a, the glass preform 50 is mounted. Subsequently, the upper die 81 is placed with the molding surface 81a facing downward, and then the molding surface 81a is brought into contact with the glass preform 50.

Next, as shown in FIG. 2(b), the glass preform 50 is heated to its glass transition temperature to be melted, and then is pressed, thereby molding the first optical member 55. In this pressing, the upper die 81 may be pressed against the glass preform 50, the lower die 82 may be pressed against the preform 50, or the upper die 81 and the lower die 82 may be pressed against the glass preform 50 at a time. Then, the glass preform 50 is cooled. In this manner, the first optical member 55 is molded.

Then, as shown in FIG. 2(c), a molding die for molding a second optical member 65 and a resin preform are prepared. The resin preform 60 is preferably made of an energy-curing resin (e.g., a UV-curing resin, a thermosetting resin, or an electron beam-curing resin) and is preferably melted beforehand. The softening temperature of the resin preform 60 is preferably lower than the glass transition temperature of the first glass. The molding die includes a lower die 91. The lower die 91 has a molding surface 91a. The molding surface 91a is used for molding a lens surface of the second optical member 65 and, therefore, partially has an uneven portion corresponding to a second uneven region. Then, the melted resin preform 60 is mounted on the molding surface 91a. Then, the first optical member 55 is mounted on the lower die 91 such that the optical axis of the first optical member 55 coincides with the center axis of the molding surface 91a.

Thereafter, as shown in FIG. 2(d), the second optical member 65 is coupled to the lower lens surface of the first optical member 55 by pressing. At this time, since the softening temperature of the resin preform 60 is lower than the glass transition temperature of the first glass, it is possible to prevent deformation of the lower lens surface caused by melting of the first optical member 55 at the coupling surface upon coupling of the resin preform 60 to the first optical member 55. Subsequently, with application of given energy, the second optical member 65 is solidified. The given energy is, for example, UV energy in the case of using a resin preform 60 made of a UV-curing resin. In this manner, a composite optical element 1 illustrated in FIG. 1 is molded.

As described above, in the composite optical element 1 of this embodiment, the first uneven region 12a is formed in part of the lens surface 12 and the second uneven region 22a is formed in part of the lens surface 22. This enables the first and second uneven regions 12a and 22a to be easily and accurately molded, as compared to a composite optical element in which an uneven region is formed in the entire lens surface. As a result, optical properties of the composite optical element 1 of this embodiment may be enhanced.

The composite optical element 1 of this embodiment is manufactured by pressing, and thus can be accurately molded at one molding process. Accordingly, unlike the case of forming a composite optical element by employing a method (e.g. polishing or grinding) except for pressing, a composite optical element may be manufactured with high yield.

A composite optical element 1 as disclosed herein is applicable to optical equipment such as an imaging device, an illuminating device, or an optical disk recording/reproducing device. An imaging device is used for taking a picture of an object and is, for example, a digital still camera or a digital video camera. An illuminating device is used for illuminating an object and is, for example, a projector. An optical disk recording/reproducing device is used for recording/reproducing a Digital Versatile Disc (hereinafter, referred to as a DVD), a Compact Disc (hereinafter, referred to as a CD), or a Blu-ray Disc (a registered trademark, hereinafter, referred to as a BD®), for example. Generally, the wavelength of a light source for recording/reproducing and the thickness of an optical disk, for example, differ among DVDs, CDs, and BDs. Thus, to perform recording/reproducing on/from DVDs, CDs, and BDs with one optical disk recording/reproducing device, contrivance is needed for an optical system. The use of the composite optical element 1 of this embodiment may implement an optical disk recording/reproducing device having compatibility among a plurality of types of information recording media.

The shapes of the first and second optical components and the first and second uneven regions are not limited to those described above. Modified examples thereof are described below.

First Modified Example

Figure 3:
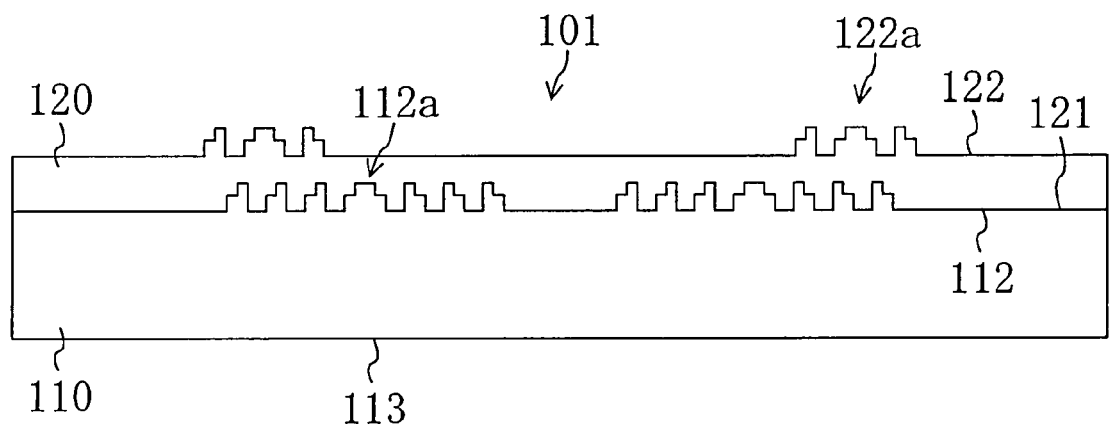
FIG. 3 is a cross-sectional view schematically illustrating a composite optical element according to a first modified example of Embodiment 1.

FIG. 3 is a cross-sectional view schematically illustrating a composite optical element 101 according to a first modified example. In the composite optical element 101 of this modified example, a first optical component 110 is formed in the form of a plate, and a first uneven region 112a and a second uneven region 122a are both diffraction parts each having a stepped section.

Specifically, the first optical component 110 has a planar lens surface 112 and a planar lens surface 113. At the lens surface 112, a second optical component 120 is coupled to the first optical component 110. As in Embodiment 1, the composite optical element 101 of this modified example includes first and second uneven regions 112a and 122a functioning as diffraction parts, and thus has substantially the same advantages.

Second Modified Example

Figure 4:
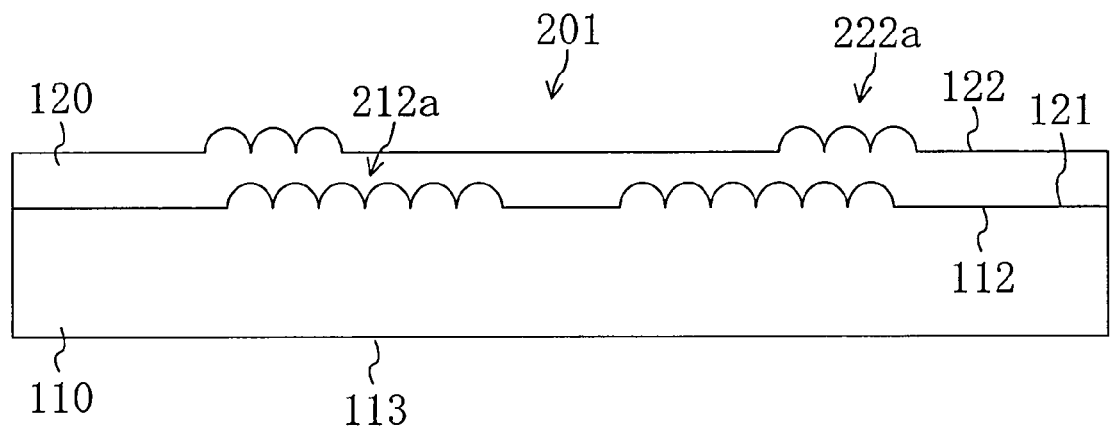
FIG. 4 is a cross-sectional view schematically illustrating a composite optical element according to a second modified example of Embodiment 1.

FIG. 4 is a cross-sectional view schematically illustrating a composite optical element 201 according a second modified example. In the composite optical element 201 of this modified example, a first optical component 110 is in the form of a plate, as the composite optical element 101 of the first modified example, but each of a first uneven region 212a and a second uneven region 222a is a lens array region in which a plurality of concave lenses are arranged.

As described above, the first and second uneven regions 212a and 222a are lens array regions in the composite optical element 201 of this modified example. Accordingly, light having a wavelength $\lambda_1$ passes through the first uneven region 212a and is focused, whereas light having a wavelength $\lambda_2$ ($\neq \lambda_1$) passes through an overlapping portion where both the first uneven region 212a and the second uneven region 222a are present, and is focused.

Third Modified Example

Figure 5:
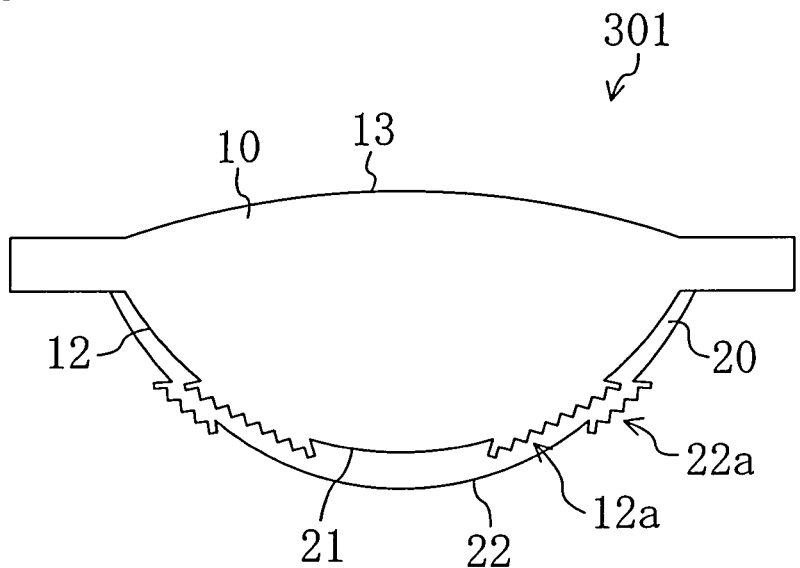
FIG. 5 is a cross-sectional view schematically illustrating a composite optical element according to a third modified example of Embodiment 1.

FIG. 5 is a cross-sectional view schematically illustrating a composite optical element 301 according to a third modified example. The composite optical element 301 of this modified example is approximately the same as the composite optical element 1 of Embodiment 1, but both a first uneven region 12a and a second uneven region 22a are phase stepped regions each having a stepped section.

Since the first and second uneven regions 12a and 22a are phase stepped regions in the composite optical element 301 of this modified example, the phase of an incident luminous flux can be converted in the first uneven region 12a or an overlapping portion where both the first uneven region 12a and the second uneven region 22a are present.

Fourth Modified Example

Figure 6:
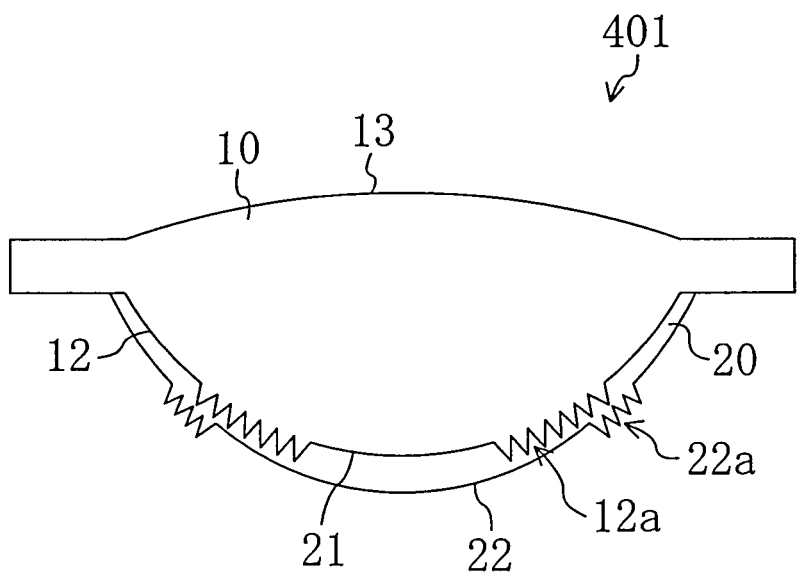
FIG. 6 is a cross-sectional view schematically illustrating a composite optical element according to a fourth modified example of Embodiment 1.

FIG. 6 is a cross-sectional view schematically illustrating a composite optical element 401 according to a fourth modified example. The composite optical element 401 of this modified example is approximately the same as the composite optical element 1 of Embodiment 1, but each of a first uneven region 12a and a second uneven region 22a is an antireflective region. Specifically, in each of the first and second uneven regions 12a and 22a, a plurality of projections in the form of cones are arranged at a pitch approximately equal to the wavelength for preventing reflection.

Since both the first and second uneven regions 12a and 22a are antireflective regions in the composite optical element 401 of this modified example, reflection of light with a wavelength approximately equal to the above-mentioned pitch may be prevented. The pitches of the first uneven region 12a and the second uneven region 22a may differ from each other. Then, two light beams having different wavelengths can be prevented.

Embodiment 2

Figure 7:
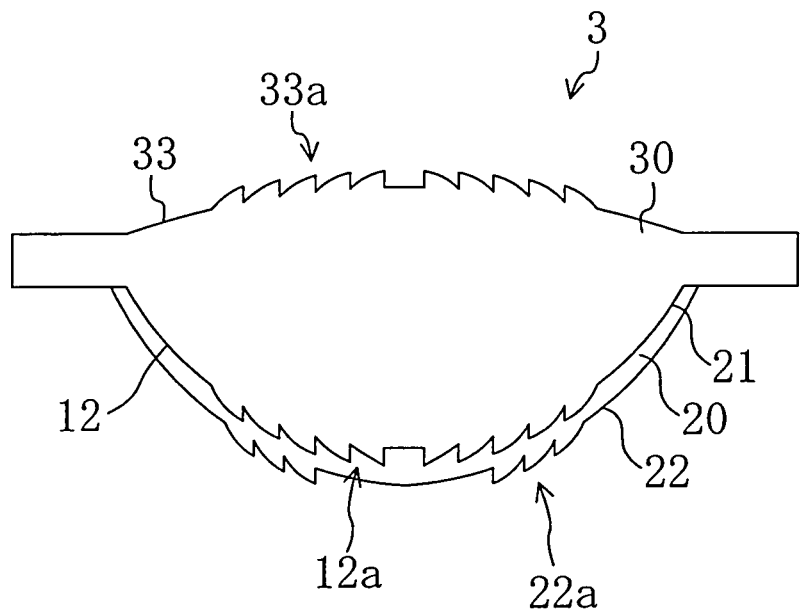
FIG. 7 is a cross-sectional view schematically illustrating a composite optical element according to Embodiment 2.

FIG. 7 is a cross-sectional view schematically illustrating a structure of a composite optical element 2 according to Embodiment 2. As illustrated in FIG. 7, in the composite optical element 2 of this embodiment, a third uneven region 33a is also provided in part of a lens surface 33 of a first optical component 30. The third uneven region 33a may be a diffraction part having a sawtooth section as in Embodiment 1, or may be in the form described in one of the first through fourth modified examples.

Embodiment 3

Figure 8:
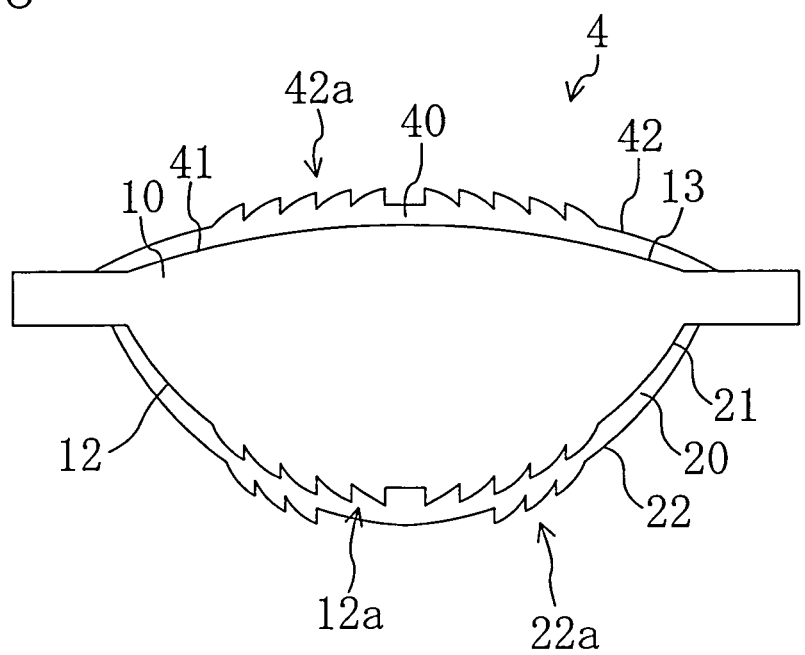
FIG. 8 is a cross-sectional view schematically illustrating a composite optical element according to Embodiment 3.

FIG. 8 is a cross-sectional view schematically illustrating a structure of a composite optical element 3 according to Embodiment 3. As illustrated in FIG. 8, the composite optical element 3 of this embodiment further includes a third optical component 40.

Specifically, the third optical component 40 is coupled to the first optical component 10 at the lens surface 13 of Embodiment 1. The third optical component 40 is provided with a lens surface (fourth optical functional surface) 42 at the side opposite to a second coupling surface 41. The lens surface 42 partially has a fourth uneven region 42a. The fourth uneven region 42a may be a diffraction part having a sawtooth section as the third uneven region 33a of Embodiment 2, or may be in the form described in one of the first through fourth modified examples.

Other Embodiments

Embodiments 1 through 3 of the present invention may have the following structures.

In the foregoing embodiments, the first optical component has an aspherical lens surface. Alternatively, the lens surface may be planar as in the first and second modified examples, or may be spherical, cylindrical, ellipsoidal, or toric.

In the foregoing embodiments, the second optical component is made of an energy-curing resin. Alternatively, the second optical component may be made of a thermoplastic resin. In the case of molding the second optical component using a thermoplastic resin, a melted resin is poured in an uneven region of a lower die, then the first optical component is pressed against the lower die, and then the resin is cooled after being shaped.

Material for the first and second optical components are not limited to those described above. Each of the first and second optical components may be made of glass or resin. In the first and second optical components, an impurity not affecting optical properties may be mixed.

The first optical component is not necessarily press-molded, and may be formed by etching or injection molding. The second optical component may be formed by being applied onto the lens surface of the first optical component with, for example, a spin coating process or a squeezing process and then being cured.

The first and second uneven regions are not necessarily present around the optical axis, and may be present at the rim, for example. Two or more types of uneven regions may be provided in a lens surface.

INDUSTRIAL APPLICABILITY

As described above, the present invention is applicable to optical disk recording/reproducing devices and also applicable to imaging devices (e.g., digital still cameras and digital video cameras) and display devices (e.g., projectors).

The invention claimed is:

1. A composite optical element, comprising:
   a first optical component having a first optical functional surface including a first smooth surface and a first uneven surface, and made of first glass; and
   a second optical component made of a material different from the first glass, coupled to the first optical component in direct contact with the first smooth surface and the first uneven surface of the first optical functional surface, and having a second optical functional surface at a side opposite to a first coupling surface of the second optical component at which the second optical component is coupled to the first optical component, the second optical functional surface including a second smooth surface and a second uneven surface,
   wherein the first optical component has a third optical functional surface at a side opposite to the first optical functional surface, and
   the third optical functional surface has a third smooth surface and a third uneven surface.

2. The composite optical element of claim 1, wherein each of the first and second uneven surfaces is at least one of a diffraction part, a lens array region including a plurality of concave or convex lens surfaces, a phase stepped region, and an antireflective region.

3. The composite optical element of claim 1, wherein the second optical component is made of an energy-curing resin.

4. The composite optical element of claim 1, wherein the first optical functional surface and the second optical functional surface are curved in their entireties.

5. A composite optical element, comprising:
   a first optical component having a first optical functional surface including a first smooth surface and a first uneven surface, and made of first glass; and
   a second optical component made of a material different from the first glass, coupled to the first optical component in direct contact with the first smooth surface and the first uneven surface of the first optical functional surface, and having a second optical functional surface at a side opposite to a first coupling surface of the second optical component at which the second optical component is coupled to the first optical component, the second optical functional surface including a second smooth surface and a second uneven surface,
   wherein the first optical component has a third optical functional surface at a side opposite to the first optical functional surface,
   the composite optical element further comprises a third optical component coupled to the first optical component at the third optical functional surface and having a fourth optical functional surface at a side opposite to a second coupling surface of the third optical component at which the third optical component is coupled to the first optical component, and
   the fourth optical functional surface has a fourth smooth surface and a fourth uneven surface.

6. A composite optical element, comprising:
   a first optical component having a first optical functional surface including a first smooth surface and a first uneven surface, and made of first glass; and
   a second optical component made of a material different from the first glass, coupled to the first optical component in direct contact with the first smooth surface and the first uneven surface of the first optical functional surface, and having a second optical functional surface at a side opposite to a first coupling surface of the second optical component at which the second optical component is coupled to the first optical component, the second optical functional surface including a second smooth surface and a second uneven surface,
   wherein the first uneven surface at least partially overlaps the second smooth surface when viewed toward an optical axis.

* * * * *